(No Model.)
C. L. COFFIN.
WELDING METALS ELECTRICALLY.
No. 492,713. Patented Feb. 28, 1893.
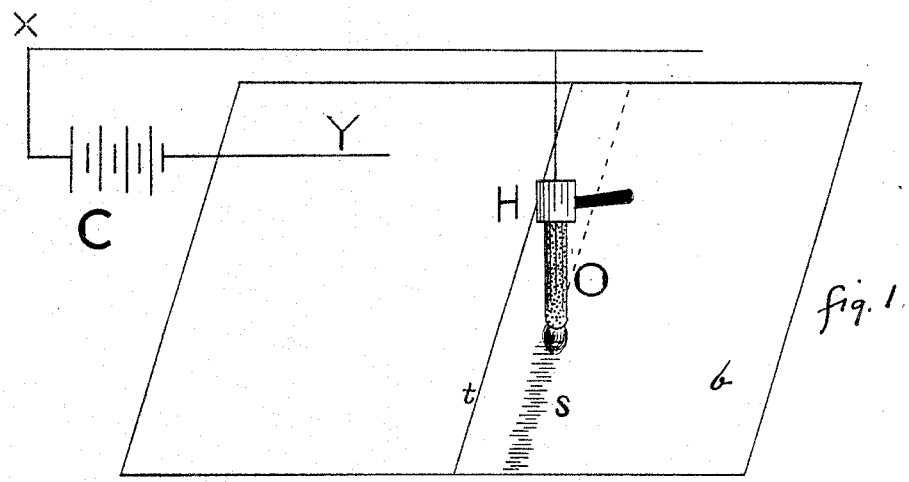
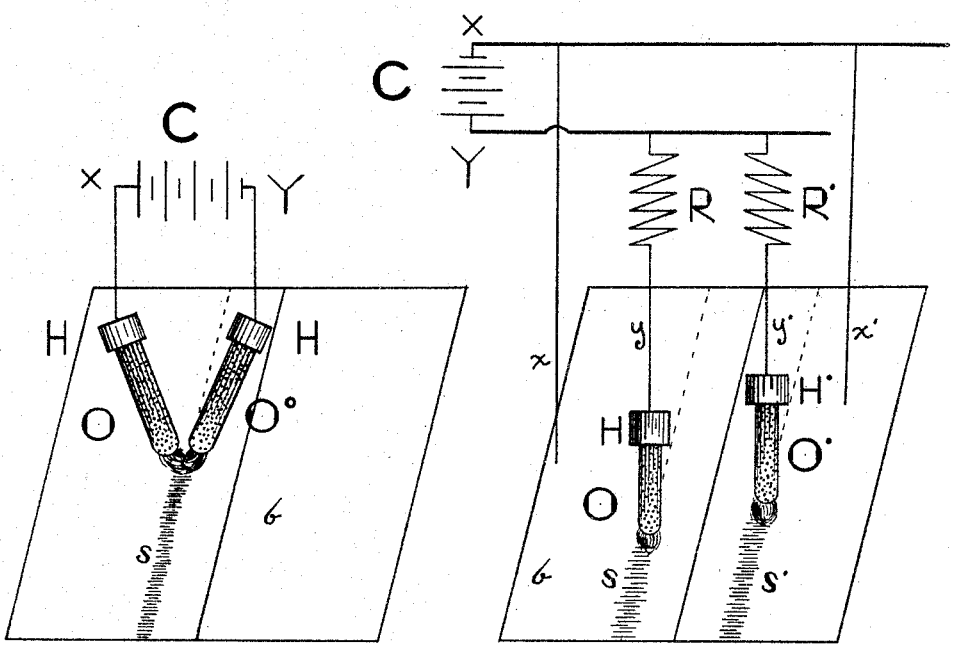
WITNESSES
Geo. H. Lothrop
Gertrude H. Anderson
INVENTOR
Charles L. Coffin

UNITED STATES PATENT OFFICE.

CHARLES L. COFFIN, OF DETROIT, MICHIGAN.

WELDING METALS ELECTRICALLY.

SPECIFICATION forming part of Letters Patent No. 492,713, dated February 28, 1893.

Application filed October 29, 1892. Serial No. 450,349. (No specimens.)

*To all whom it may concern:*

Be it known that I, CHARLES L. COFFIN, of Detroit, in the county of Wayne and State of Michigan, have invented a new and useful Improvement in Welding Metals Electrically, of which the following is a specification.

My invention consists in an improved mode of welding metals electrically.

The drawings are diagrammatic views, Figures 1 and 3 showing that mode in which the article to be welded is in circuit with an extraneous conductor, and an arc is formed between said article and said conductor, and Fig. 2 showing an arc sprung between two conductors extraneous to the material to be welded.

In all the drawings C represents a source of electric energy, X and Y conductors leading therefrom, O O carbons, H insulating handles for said carbons, $t$ the line of proposed joint or seam to be welded, and $b$ the articles to be welded together.

R R' in Fig. 3 represent resistances and $xx'$, $y\,y'$ represent conductors for placing the two carbons O O and the material B in multiple arc.

In the operation of welding shown in Figs. 1 and 3, where an arc is sprung between the material and an extraneous conductor, the effect of such arc is to modify the character of the metal, usually to convert iron into steel, and thus destroy the homogeneity at the joint.

For the system illustrated in Fig. 2 this evil does not occur if the carbons O O are held at such a distance from the metal that the carbon particles forming the voltaic arc do not affect the metal, but if the carbons are held too near the metal, the same result, though to a smaller extent, may occur. For the purpose of avoiding this difficulty I apply the arc not on the line of the proposed weld, $t$, but at such a distance therefrom (indicated by the dotted lines S) that the heating effect thereof will extend to the line of weld, $t$, whereby the modifying or steelifying effect of the arc is confined to the line of its application and the character of the metal at the proposed line of weld is unchanged. When the metal at the line of the proposed seam is brought to a welding heat in this manner, the weld may be completed by pressure, or hammering or in any known way.

What I claim as my invention, and desire to secure by Letters Patent, is—

The herein described mode of heating metal electrically for welding, consisting in subjecting said metal to the action of a voltaic arc at a short distance from the proposed seam, whereby the metal is not changed by the action of the arc at the line of weld.

CHARLES L. COFFIN.

Witnesses:
GEO. H. LOTHROP,
GERTRUDE H. ANDERSON.